Aug. 19, 1941.  F. M. M. B. SALOMON  2,252,815
TRANSMISSION OF MECHANICAL ENERGY
Filed Aug. 6, 1937   3 Sheets-Sheet 1
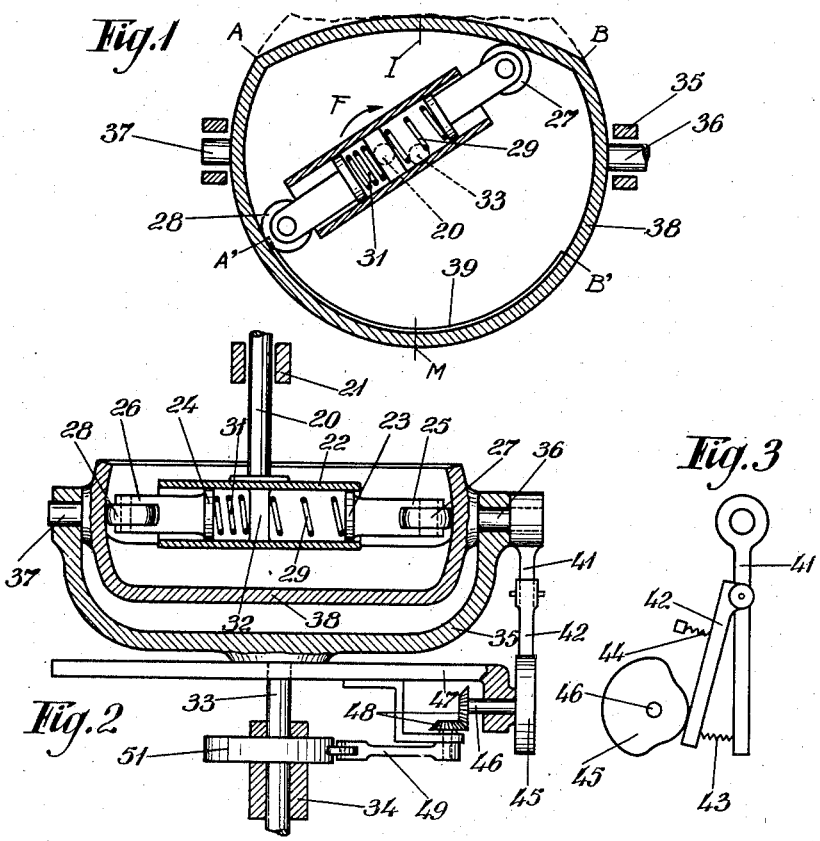
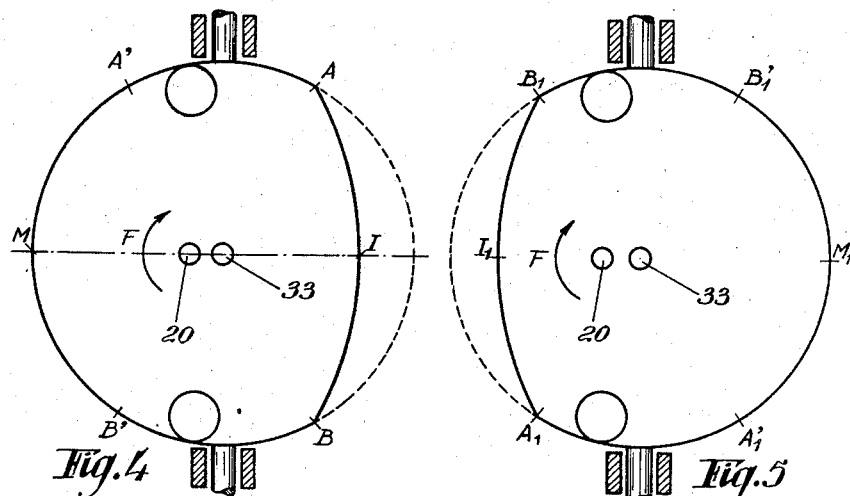
INVENTOR
F. M. M. B. SALOMON
By Young, Emery + Thompson
ATTYS.

Aug. 19, 1941.　　F. M. M. B. SALOMON　　2,252,815
TRANSMISSION OF MECHANICAL ENERGY
Filed Aug. 6, 1937　　3 Sheets-Sheet 2

INVENTOR
F. M. M. B. SALOMON
BY
Young, Emery & Thompson
ATTYS.

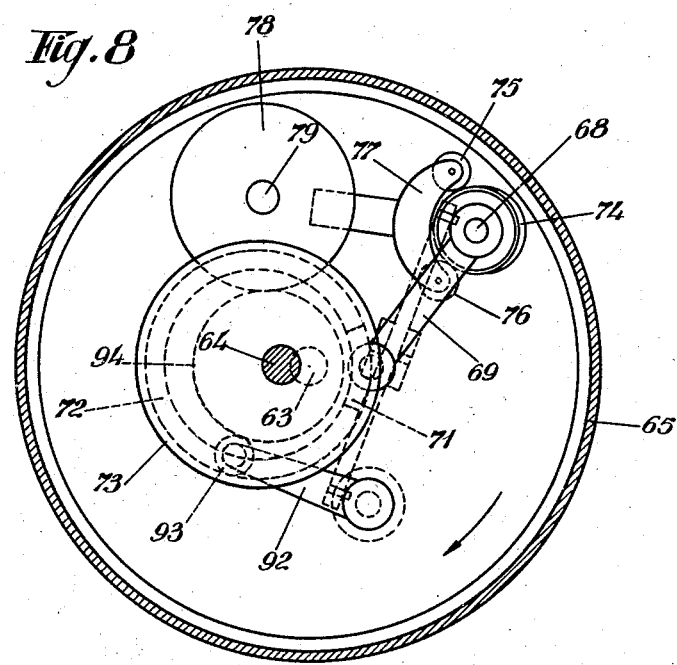
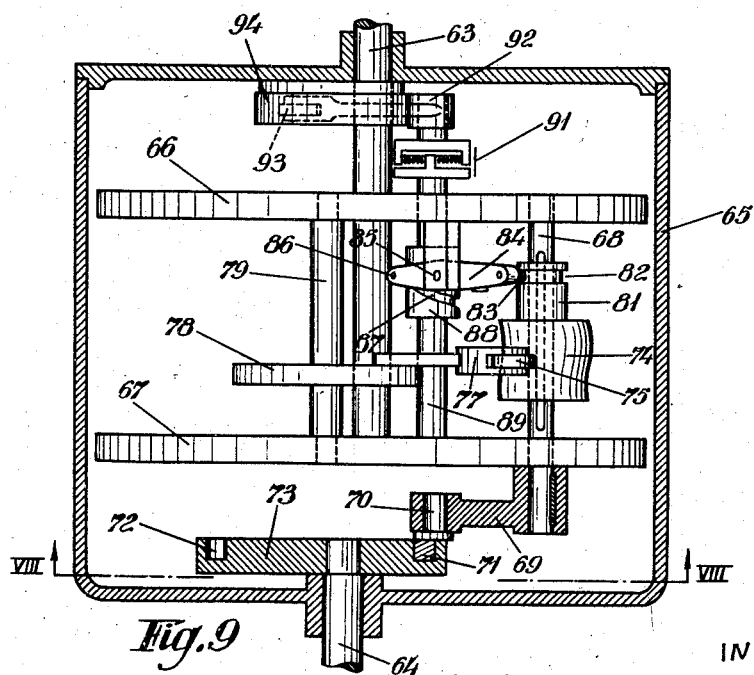

Patented Aug. 19, 1941

2,252,815

UNITED STATES PATENT OFFICE 2,252,815

TRANSMISSION OF MECHANICAL ENERGY

François Marie Michel Bernard Salomon, Paris, France

Application August 6, 1937, Serial No. 157,789
In France February 28, 1936

5 Claims. (Cl. 74—64)

It is a known fact that a certain class of mechanisms for the transmission of mechanical energy are now in use which are chiefly employed as speed-changing devices (or torque transformers) of the continuous type, in which no kinematic or positive connections are employed between the driving shaft and the driven shaft. I have described an apparatus of this type in my German Patent No. 418,559.

In this class of mechanism, the action which takes place between the driving and the driven shaft is not of a kinematic nature, but is in fact dynamic. For this purpose, reactions take place between the parts which have a direct or an indirect connection with the driven shaft, and such reactions may be obtained by the use of springs or of centrifugal forces, or of forces of inertia, from any desired source.

A certain number of mechanisms of this class, which in fact serve only as clutches, have been proposed erroneously, as speed-changing devices, but these have not come into practical use.

Other devices of this known class are indeed actual transformers of torque, but in spite of their apparent diversity, they all operate according to the following principle:

1. The continuous circular movements due to various devices will give rise, to alternate movements which will be superposed, in some cases, upon the continuous movements which take place.

2. The resulting alternate impulses are selected by devices which in their various forms (free wheels, etc.) are reduced to ratchet devices, by which only the impulses in the proposer direction will be transmitted, and thus, in fact, the impulses will be rectified.

However, it has been found that the ratchet devices (or loose wheels) have the greatest drawbacks in practice, as the total power to be transmitted must pass through such devices, and at very high frequencies, which are often equal to the rate of rotation of the driving shaft.

It is at this frequency—for instance 50 times per second—that the ratchet device serves to successively couple and uncouple two parts. This causes great difficulties in the construction, as well as a rapid wear and a reduced output. For this reason, such speed-changing devices have not come into extensive use.

A careful study of this question leads to the conclusion that for theoretical as well as practical reasons, it is impossible to eliminate any of the parts engaged in a selection of the impulses, but that it is feasible, in conformity to the present invention, to eliminate the aforesaid drawbacks by making this selection by entirely novel means, and in the following manner:

A first device, which has a direct or an indirect relation to the driving shaft, is in a combination of the first above-mentioned class with a second device which has a direct or an indirect relation to the driven shaft. In the absence of a selecting device, it has been shown by the experience of a great number of inventors as well as by theory itself, that when thus constructing an actual speed-changing device and not merely a clutch, the impulses which are brought upon the driven shaft by the mutual reactions of the two devices will be alternately positive and negative, and that their total resultant will be null.

According to the present invention, shortly before the time when a negative impulse is to follow a positive impulse, a device which will hereinafter be designated as a "directing device," will tend to substitute for the combination of the first above-mentioned class a combination of the second above-mentioned class between the parts in consideration, thus inverting the value of the resulting impulse. When the impulse which is produced after this substitution is in turn, about to become negative, the directing device tends to replace the combination of the second class by a combination of the first class, and so on. A further explanation will be given accompanied by actual examples, of what is understood by "substitution of one combination for another."

As a rule, use will be made, according to the invention, in addition to the "directing device" of a device termed "controlling device," which in some cases may be reduced to a spring or like elastic member having a suitable position, whose function is only to allow the substitution of one combination for another at the times when this will offer no prejudice, and for instance when it will not exercise any practical force upon the said "directing device" in this connection.

The assemblage consisting of the "directing device" and the "controlling device" will form what may be termed the "distributer," and the word "distribution," by analogy with heat engines, will be applied to the function of this device.

In this manner, according to the invention, the "selection" is replaced by the "distribution." It is necessary to show the fundamental difference between these two operations.

In the selection (by ratchets), two parts, which are usually two concentric shafts, are alternately connected together for a certain time and are then disconnected. Thus the degree of liberty of the assemblage consisting of the two shafts will pass constantly and alternately from two to one and from one to two. In other words when the two shafts are connected they are capable of relative rotation in only one direction and when not connected they are capable of relative rotation in two directions; this will necessarily produce shocks in the transmission.

On the contrary, in the distribution, there is never any degree of liberty, as there is never a kinematic connection. This will afford an extraordinary ease of running and a most progressive action.

The invention further comprises the particularly simple formation of the above mentioned "combinations," which serve to produce, without kinematic connection and by purely dynamic means, the pulsatory transmission of the energy, and this formation provides for a particularly simple use of the principle of distribution above mentioned.

In particular, the forces which give rise to the mutual reactions of the combined parts can be obtained from springs or they can be produced by centrifugal forces or forces of inertia, from any source, or by any other known means.

As to the combined parts, these may have widely varying forms, such as those of cams with multiple surfaces, or cam-shaped members. One combination can be substituted for another by a great variety of means, for instance by a relative movement of translation or a relative rotation of the two combined parts, of which examples will be given below. This will bring into use different portions of the cam surfaces which have an active effect.

A distinction should be made between the case in which the driving shaft and the driven shaft are in line with each other, and the case in which they are not.

In the first case, it is not possible to exert upon the driven shaft a torque which differs from the driving torque without producing a reaction couple bearing upon the machine frame. Among the parts employed in combination, as above mentioned, it will thus be necessary, according to the invention, that at least one part shall be secured to the machine frame, in order to constitute the reaction part. For this purpose, use can be made, for instance, on the one hand, of a driving part and a driven part, and on the other hand, of the combination of a driving part and a reaction part; the action of the distributer will be exerted, for instance, upon this last-mentioned combination, and will modify it periodically.

On the contrary, in the case in which the driving shaft and the driven shaft are not in line, it will not be necessary to use a reaction part, and the action of the distributer will only be exerted upon the combination of a part which has a direct or indirect relation to the driven shaft, in order to modify it periodically.

In practice, in order to obtain a total action upon the driving shaft which is as regular as possible, it is not desirable, as a rule, to use only a single combination of parts subjected to the action of the distributer, but to use a certain number of such combinations which are displaced in phase.

In all cases, the driving shaft and the driven shaft can be changed about, in principle.

The apparatus according to the invention are adapted for a great variety of industrial uses, and may chiefly be employed for motor vehicles. In this latter case, in particular, they can be substituted not only for the speed-changing mechanism, but also for the clutch. The speed-changing lever and the clutch pedal can thus be replaced—in all cases in which there is no automatic action—by a single device acting upon the "distributer" either to modify the phases of the distribution, or to modify the extent of the movements of the distributer. The reverse motion of the vehicle can be obtained simply by reversing the distribution.

A certain number of constructional forms of the apparatus in conformity to the invention are shown by way of example in the accompanying drawings.

Fig. 1 is a diagrammatic cross-section of a first form of construction.

Fig. 2 is a lengthwise section of this form of construction.

Fig. 3 is a side view of a detail of Fig. 2.

Figs. 4 and 5 are diagrammatic views showing the operation of the apparatus represented in Figs. 1 and 2.

Fig. 8 is transverse view of another constructional form of the mechanism.

Fig. 9 is a lengthwise section of the construction shown in Fig. 8.

Figure 6:
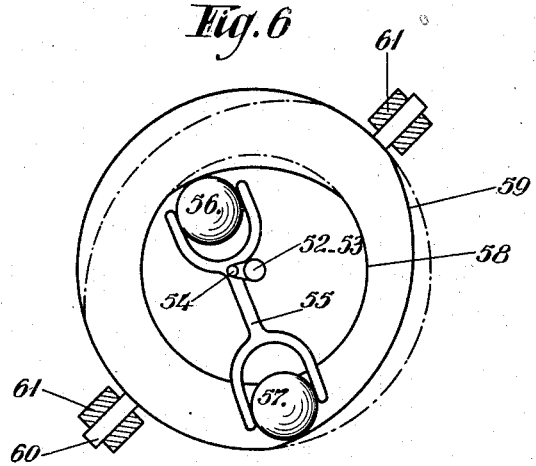
Fig. 6 is a diagrammatic cross-section of the principal parts of a modified construction of the apparatus.

The embodiment shown in Figs. 1 to 5 comprises a driving shaft 20 which is mounted in a fixed bearing 21 and carries at its end a cylinder 22 containing two pistons 23 and 24 which form respectively the forks 25 and 26 for the rollers 27 and 28.

The pistons 23 and 24 are urged outwardly by respective springs 29 and 31, whose rear ends bear upon a partition 32 situated at the middle of the cylinder 22.

The apparatus comprises a secondary or driven shaft 33, which is mounted in a fixed bearing 34 and carries at one end a fork 35 whose arms carry the respective journals 36 and 37 supporting a cam-shaped member 38 having a hollow form. The rollers 27 and 28 are adapted to roll in the interior of this member 38.

The shafts 20 and 33 are parallel to each other, but are not in line, as is clearly shown in Fig. 1.

As indicated in section, in Fig. 1, the cam-shaped member 38 comprises a cam surface whose outline consists of an arc A I B whose centre of curvature is not located on the axis of the driven shaft 33, an arc B B' corresponding to a hemispherical cap, followed by an arc B' A' which is concentric with the driven shaft 33 and corresponds for instance to a part of a cylinder, and lastly an arc A' A corresponding to a hemisphere cap whose centre is located on the shaft 33.

The second surface of the cam-shaped member 28 has the same outline as the preceding, but as shown in Figs. 4 and 5, the part $A_1 B_1$ of the second cam surface is adjacent the part A' B' of the first surface, and inversely.

On the contrary, the concentric portions $A'_1 A_1$ and $B_1 B_1$ correspond to the same hemispherical caps which contain the arc A' A and B B' of the first-mentioned surface of the cam.

It should be noted that in the concentric parts B' A' and $B'_1 A'_1$, the surfaces of the cams are limited on each side by two ribs 39 which strictly confine the roller 27 or 28 passing through this portion, thus preventing the cam-shaped member 38 from turning upon its journals as long as the roller is here situated.

The journal 36 of the member 38 carries, beyond the fork 35, a lever 41 to which is pivoted a second lever 42 which is urged away from the lever 41 by a spring 43, which is subject to compression.

On the other hand, the pair of levers 41 and 42 is urged by a spring 44, operating by traction, in a direction such that the lever 42 will be in permanent contact with a cam 45 whose shaft 46 is mounted on a disc 47 which is secured to the fork 35 and to the driven shaft 33.

The shaft 46 of the cam 45 is connected by bevel gears 48 to a lever 49 which is constantly pressed by a suitable spring (not shown) against a cam 51 which is stationary and is secured, for instance, to the bearing 34 of the shaft 33.

The operation of the above-mentioned apparatus is as follows. Let it be supposed that the parts have the position shown in Fig. 1, and that the driving shaft 20 is rotated in the direction of the arrow F. The roller 27 which is driven out by the spring 29 will make contact with the curved part I B and will tend to rotate the member 38, and with it the driven shaft 33, in the contrary direction to the arrow F. However, it will be readily observed that when the roller 27 is located upon the part A I of the cam surface, it will tend to rotate the member 38 and the shaft 33 in the direction of the arrow F, with a greater force, as at this time the spring 29 is much more compressed. These progressive differences of the compression of the spring 29 are due to the fact that in the stated position, the arc A I is nearer the driving shaft 20 than the arc I B. Hence the total impulse upon the member 38 and the driven shaft 33 will be the sum of the successive impulses, and it thus takes the direction of the arrow F. But it will be observed that if the member 38 yields to this total impulse, by its inertia, the line M I of the cam surface will soon intersect the geometrical axis of the driving shaft 20, and the total impulse would now be reversed, so that the member 38 would no longer be driven in the direction of F.

In order to avoid such an occurrence, another cam surface is substituted for the one that has just been covered, and as there are two operating rollers 27 and 28, it is necessary to make two substitutions for each revolution of the member 38 and of the shaft 33.

The said periodic substitutions are effected by the controlling device, which comprises the parts 41 to 51. In fact, the lever 49, when turning around the fixed cam 51, will pivot about, thus turning the cam 45. This latter will periodically drive out the lever 42 and also the lever 41, by means of the spring 43, and thus the member 38 will be turned upon its journals 36 and 37 in order to substitute another cam surface for the first, on the path of the rollers 27 and 28.

This substitution can be readily effected, provided it takes place at the proper time; this is what occurs when the rollers 27 and 28 are situated, as shown in Fig. 4, on the arcs A A' and B B' whose centre is situated on the axis of the shaft 33 and also on the axis of the journals 36 and 37.

In order that the substitution of one roller race for another shall take place at the proper time, the mechanism comprises a controlling device which holds the member 38 before the proper time has arrived.

The said controlling device consists of the ribs 39 associated with the portion B' A' of the cam surface, which prevent the member 38 from turning when a roller 27 or 29 is situated between the said ribs.

When the member 38 is thus held fast, it will be of little importance that the cam 45 shall act, or not, upon the lever 42, for the only effect in this case will be the compression of the spring 43. It is only when the roller 27 or 28 leaves the portion B' A' of the cam surface, that the pivoting movement of the member 38 will take place.

After this substitution, the parts have the position shown in Fig. 5, and the roller 27 or 28 which acts upon the succeeding surface of the cam will actuate the member 38 and the shaft 33 in the direction of the arrow F, and the movement continues in this manner; the shafts 20 and 23 will rotate in the same direction but at different speeds, if the driving torque and the load torque are not equal.

The inertia of the assemblage of the rotating masses ensures the continuous rotation of the driven shaft 35. On the other hand, it is possible to mount between the driving shaft 20 and the driven shaft 33 a certain number of devices which resemble the one above described but which have an angular spacing, in a manner similar to that of the pistons of a multicylinder engine, thus obtaining a great regularity for the speed of the driven shaft 33.

In the apparatus above described, the driven forces are supplied by the springs 29 and 31, but it is evident that in order to produce these driving forces, use may be made of other arrangements, for instance the centrifugal or gyroscopic forces of inertia alone or combined, with springs or with electric or magnetic forces.

As shown in Figs. 1 to 4, the shafts 20 and 33 are not in line, and it is this displacement which produces the reaction torque providing for the transmission of the mechanical power with a driving torque which differs from the load torque.

It is an easy matter to adopt the present apparatus to the case in which it is necessary that the driving and driven shafts be in alignment.

Figure 7:
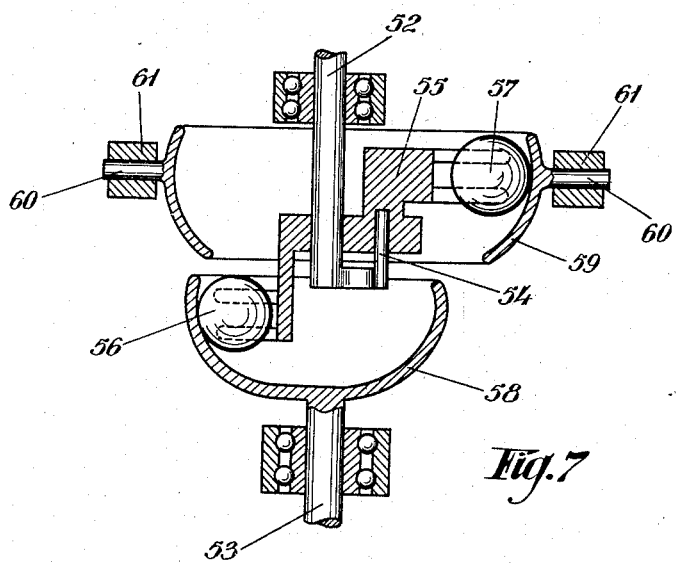
Fig. 7 is a lengthwise section of the modification shown in Fig. 6.

One solution of this problem is given by the modification shown in Figs. 6 and 7, in which the driving shaft 52 and the driven shaft 53 are now placed in alignment.

At the end of the shaft 52 is mounted an excentric crank arm 54 to which is pivoted a double fork 55 adapted to drive in radial guides the balls 56 and 57 whose positions are displaced with reference to the shaft 52. No spring is used to act upon these balls, and they are free to move radially in their guides by the action of the centrifugal force which is exerted upon them during their rotation.

The ball 56 rolls upon a cam surface formed in a bowl shaped member 58 which is mounted on the driven shaft 52. The ball 57 rolls upon one or the other cam surfaces formed in a cam-shaped member 59 comprising spherical and non-spherical parts.

The said member 59 is provided with journals which are mounted in bearings 61 secured to the frame.

The member 59 may be pivoted on its journals by means of a directing device resembling the one described with reference to the first embodiment, which is under the action of a controlling device of the same nature.

As the member 59 is connected to the frame by bearings 61 it is this member that produces the suitable reaction torque.

Fig. 6 shows the outlines of the respective cam surfaces of the bowl-shaped member 58 and of the cam-shaped member 59, and by considerations analogous to what has been set forth with reference to the first embodiment, it is shown that the rotation of the driving shaft 52 causes the rotation of the driven shaft 52, by the action of the centrifugal force of inertia exercised upon the ball 56.

Instead of using the elasticity of springs, or centrifugal force, it is possible, in order to actuate the driven shaft, to take advantage of the forces of inertia which are produced when the masses are subjected to alternate movements.

An application of this kind is realized in the constructional forms of the device which are shown in Figs. 8 and 9 in which the driving and the driven shafts are indicated respectively at 63 and 64.

The said shafts are mounted in a fixed casing 65, and although they are parallel, they are not in line with each other.

To the driving shaft 63 are keyed two discs 66 and 67 between which is mounted in the first place a shaft 68 carrying a crank 69.

On the outer end of the crank 69 is mounted a journal for a slider 71 having the form of a sector of a circle, which is slidable in the circular groove 72 formed in an eccentric disc 73 secured to the driven shaft 64.

Upon the intermediate portion of shaft 68, is mounted, a cam-shaped member 74 which is adapted for lengthwise displacement on the shaft 68, but will not rotate relatively to this latter a key slide connection being provided.

The said cam-shaped member is in contact with two rollers 75 and 76 mounted on the end of a fork 77 which is secured to a flywheel 78 keyed to a shaft 79 which is pivotally mounted on the discs 66 and 67.

The cam-shaped member 74 comprises cam surfaces of suitable shape of the "constant width type," and thus, whatever be the position of the cam-shaped member 74 with references to the said rollers or like rolling parts, such parts will always be in contact with the said cam-shaped member.

The member 74 carries an appendage 81 having an annular groove 82 in which is engaged a stud 83 mounted on the end of a rocking lever 84 which is pivoted, at about its middle part, on an axle 85 secured to the disc 66.

The other end of the lever 84 carries a stud 86 which is engaged in a helical groove 87 formed in cylindrical piece 88 mounted on a shaft 89 which is located between the discs 66 and 67.

One end of the shaft 89 is connected by an elastic coupling 91 to an arm 92 having on its end a roller 93 which is urged by a spring (not shown) against a cam 94 secured to the casing of the apparatus in the fixed position.

The operation of the present constructional form of the apparatus is as follows:

When the driving shaft rotates, it will actuate the discs 66 and 67, and also the parts which are mounted between these latter. In consequence, the shaft 68 will be moved about the axis of the shaft 63. However, the shaft 68 is connected to the slider 71 which is engaged in the circular groove of the eccentric 73 mounted on the driven shaft 64.

It is thus evident that the lever 69 and the shaft 68 will effect a movement of oscillation on the axis of this shaft, and that the slider 71 will be displaced in the groove 72.

However, the pivoting oscillations of the shaft 68 are imparted to the cam-shaped member 74, and will cause the pivoting oscillation of the fork 77 and hence of the flywheel 78.

As the mechanical characteristics of the said flywheel have been properly determined, forces of inertia will be produced which are in opposition to the said movements of oscillation, and thus the rollers 75 and 76 will impart these forces of inertia to the cam-shaped member 74.

If no modification of the connection were provided, the total action of these forces of inertia would be null, and the driven shaft 64 would not be actuated, but in fact, during the rotation of the driving shaft 63, the arm 92 will turn about the cam 94 and will also oscillate.

This oscillation can be transmitted by the elastic coupling 91 to the shaft 89 and to the cylindrical piece 88, and this latter, owing to the helical groove 87, will effect, if the movement is possible, a pivoting of the lever 84 and thus a movement of translation of the cam-shaped member 74 along the shaft 68.

In consequence, the parts designated by the numerals 81 to 94 will constitute the distributer controlled by the cam-shaped member 94.

The alternate sliding movement of the cam-shaped member 74 upon the shaft 68 will effect the desired substitution of one cam surface for another, with reference to the rollers 75 and 76, and thus the action of the forces of inertia produced in the flywheel 78 and exercised by the said rollers upon the cam-shaped member 74, will cause a movement of the eccentric 73 and of the driven shaft 65 which is always in the same direction, and with a torque which is inversely proportional to the speed of this driven shaft.

The periodic substitution of one cam surface for another with reference to the rollers 75 and 76 should only take place when the said rollers are located on the circular concentric parts of the cam-shaped member 74.

In fact, when the said rollers are not in contact with such a part, the sliding of the cam-shaped member upon the shaft 68 would require a considerable force, as it would be necessary to overcome the antagonistic forces of inertia of the said flywheel.

It is for this purpose that the elastic coupling 91, which constitutes the "controlling device" is mounted between the arm 92 and the shaft 89.

If the fixed cam 94 should turn this arm 92, and if at this time the cone-shaped member should not be in a position in which one cam surface cannot be substituted for another without effort, the elastic parts of the coupling will yield, while the parts, 83 to 89 of the directing device will remain in the fixed position, and it is only when the cam-shaped member has pivoted sufficiently and when the rollers 75 and 76 are in contact with the circular concentric part of its surface, that the parts of the distributor can come into action in order to provide for the necessary substitution of one cam surface for another.

When the said speed-changing mechanism is not automatic, its ratio of transmission can be varied by changing the position of the fixed cam 94, by a movement of translation in its own plane, or by rotating it about the axis of the shaft 63, or by these two movements combined. This movement, which will not give rise to any difficulties of construction, can be effected for instance by the known speed-changing lever used upon motor vehicles, or by a handle or pedal.

It is evident that the apparatus shown in Figs. 8 and 9 will not afford an exactly regular driving torque upon the driven shaft 64, but a regularity which is practically sufficient can be obtained by mounting, between the discs 66 and 67, a certain number of cam-shaped members, each having its own distributer. In this event, the groove 72 may contain several sliders 71 which are displaced in angular position, and thus the total torque produced upon the shaft 64 will be practically continuous.

It is obvious that the said invention is not limited to the constructional forms herein described, and that without exceeding the limits of its general scope, a great number of other modifications may be employed which comprise practically the same groups of operative parts and serve the same purposes.

I claim:

1. A transmission mechanism comprising, in combination, a primary shaft, a secondary shaft, carrier means fixed to one of the shafts, a cam supporting shaft mounted on the carrier means, an arm fixed to the cam supporting shaft, a circular guide carried by the other shaft of the mechanism and eccentrically mounted relative to the said one shaft, a sliding element carried by the end of said arm and engaging in the guide, a cam carried by said cam supporting shaft and capable of sliding thereon, an inertia member carried by the carrier means, movable elements applied against the cam and carried by said inertia member, and means for assuring a periodic sliding of the slidable cam on its supporting shaft.

2. A transmission mechanism comprising a primary shaft, a secondary shaft, plates solid with the primary shaft, a crank shaft carried by the plates, a crank arm solid with said shafts, a circular guide carried by the secondary shaft and eccentrically mounted relative to the primary shaft, a slide at the end of the crank arm engaged in said circular guide, a cam carried by said crank shaft and capable of sliding axially thereon, a fly-wheel pivotally mounted on the plates, members applied against the cam and carried by said fly-wheel, and means for effecting the periodic sliding of the cam on the crank shaft.

3. A transmission mechanism comprising a primary shaft, a secondary shaft, plates solid with the primary shaft, a crank shaft carried by the plates, a crank arm solid with said crank shaft, a circular guide carried by the secondary shaft and eccentrically mounted relative to the primary shaft, a slide at the end of the crank arm engaged in said guide, an elongated cam carried by said crank shaft capable of axially sliding thereon, movable members connected to the plates and applied against the cam by alternative dynamic impulses, means for periodically sliding the cam for substituting one cam surface for the other in the path of travel of the movable members, means comprising a cam fixed in space, a finger carried by the plates and applied against said fixed cam, and connecting members between said finger and the slidable cam for transforming the alternative pivoting of the finger into an alternative sliding of the slidable cam.

4. A transmission mechanism comprising a primary shaft, a secondary shaft, plates solid with the primary shaft, a crank shaft carried by the plates, a crank arm solid with said crank shaft, a circular guide carried by the secondary shaft and eccentrically mounted relative to the primary shaft, a slide at the end of the crank arm engaged in said guide, an elongated cam carried by the crank shaft capable of axially sliding thereon, movable members connected to the plates and applied against the cam by alternative dynamic impulses, means for periodically sliding the slidable cam for substituting one cam surface for the other in the path of travel of the movable members, means comprising a cam fixed in space, fingers carried by the plates and applied against said fixed cam, a helical ramp driven by each finger, and a lever associated with part of said helical ramp and with the slidable cam for transforming the alternative pivoting of the finger into alternative sliding of the slidable cam.

5. A transmission mechanism comprising a primary shaft, a secondary shaft, plates solid with the primary shaft, a crank shaft carried by the plates, a crank arm solid with said crank shaft, a circular guide carried by the secondary shaft and eccentrically mounted relative to the primary shaft, a slide at the end of the crank arm engaged in said guide, an elongated cam carried by said crank shaft capable of axially sliding thereon, the surface of said cam varying from one end to the other, movable members connected to the plates and applied against the cam by alternative dynamic impulses, means for periodically sliding the slidable cam for substituting one cam surface for the other in the path of travel of the movable members, means comprising a cam fixed in space, a finger carried by the plates and applied against said fixed cam, a helical ramp driven by each finger, a lever associated partly with the helical ramp and partly with the slidable cam for transforming the alternative pivoting of the finger into alternative sliding of the cam.

FRANÇOIS MARIE MICHEL
BERNARD SALOMON.